May 4, 1954 F. M. SCALES 2,677,630
CAN WASHING AND STERILIZING PROCESS
Filed July 8, 1950
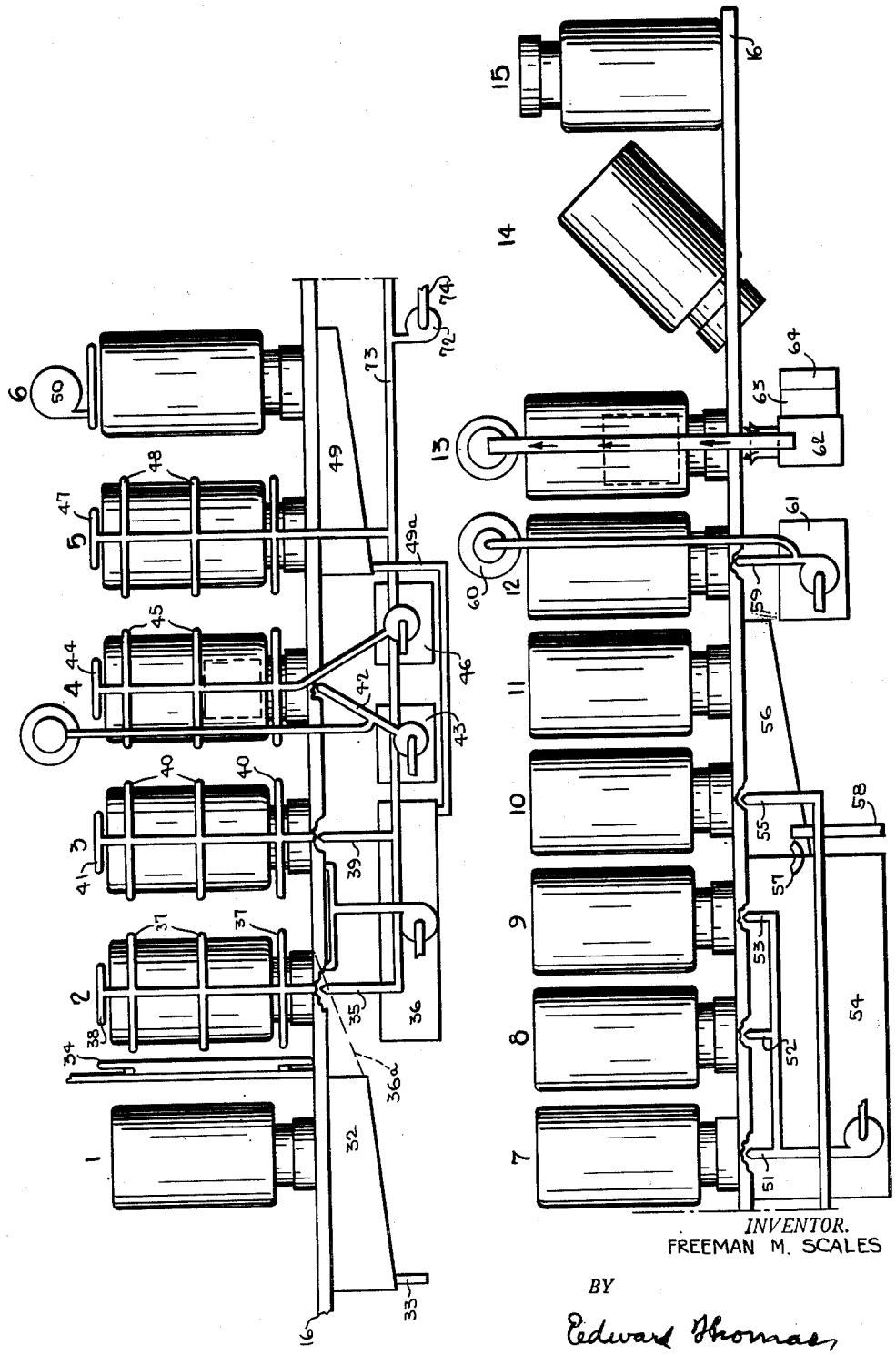
INVENTOR.
FREEMAN M. SCALES
BY
Edward Thomas
ATTORNEY Patented May 4, 1954

2,677,630

UNITED STATES PATENT OFFICE 2,677,630

CAN WASHING AND STERILIZING PROCESS

Freeman M. Scales, Achushnet, Mass.

Application July 8, 1950, Serial No. 172,760

5 Claims. (Cl. 134—23)

This invention relates to processes of washing such surfaces as metal cans and silicate enameled surfaces, and is herein disclosed in some detail as embodied in a milk can washing machine.

The problems involved in properly washing milk cans for dairymen at milk-receiving stations present in peculiar and somewhat exaggerated form, many of the problems likely to arise in the washing of many containers used for food.

The present invention has in view the cleansing and sterilizing of containers and equipment in this and other food industries and is described in some detail as carried out by the use of a homogeneous cleansing solution including fat solvents and synthetic organic detergents, either anionic, cationic or non-ionic and having a hydrogen-ion concentration from 7.0 to 10.

According to the present invention, a washing procedure is provided in which modern synthetic detergents are effectively employed in either soft or hard water, in the washing of cans and other articles, without the drastic corrosive effects of alkalies on metals and the deleterious effect of steam and very hot air on metal and on synthetic resin coatings.

However, a softened water is preferred because it gives better wetting and draining in the rinsing operations and at the same time prevents any deposit of suspended lime salts on the surface of the cans or on the part of the machine where these operations take place. The softening agent should usually produce an alkaline pH of not over 10.0. This reaction increases fat removal, promotes detergent action and at the same time is below the pH which is corrosive to tin and aluminum alloys at the temperature employed. This alkaline reaction aids in the sterilizing process by promoting the germicidal quality of the quaternary ammonium compounds used at the end of the process. The amount of softener required to give the most efficient and economical results will depend on the composition of the water, and the nature of any other materials present in it.

Almost any ion filter seems satisfactory provided the pH remains in the range 7. to 9.5. In some cases it will be found satisfactory and more economical to feed a very small quantity of a solution of the softening agent into some of the individual tanks (rinsing tanks and sterilizing solution for atomizing) instead of treating the whole water supply.

In the present illustration of the invention, the carry-over of fresh milk residues to the wash tank for the insides of the cans is prevented by giving them a very thorough tempered water rinse on the inside followed by a short drainage period and then a hot water rinse followed by a similar drainage period. Any dry milk deposits on the outsides of the can are also removed before the cans reach the washing position for the insides of the cans.

These thorough treatments are given to produce a more sanitary can by reducing to a minimum at the beginning of the operation the quantity of gross filth, milk residues and bacterial contamination, that the cans carry into the machine. This precaution at the beginning is an additional insurance to attain the exceptionally clean sterile cans produced by this process.

The formation of scale in the machine and on the cans is prevented by using water at not above 150 degrees F., by using no steam for such heating purposes, and in special cases where the water is exceptionally high in temporary hardness, so that continued heating in the tank might produce a slight turbidity in this feed water for the machine, by the use of a proper softener. In such cases, as a precaution to keep the rinse water clear and to prevent any fouling of the electric heater immersion units, where these are used, for in some cases, as on cold winter days, it is conceivable that the heating surfaces of these units may attain a temperature above 150 degrees F. In these circumstances a small quantity of the softening agent is added to the water in the supply tank to keep lime and magnesium salts in solution.

The phosphate or other softener must be well adapted for this particular application so that it will keep the water on the alkaline side but not raise the pH very much. A pH of 8.0 to 9.5 is satisfactory for the cleansing of tin and aluminum alloy cans.

In winning all the advantages of these modern synthetic detergents, it is found that they are highly effective in very small proportions, with the result that they economically replace the cheaper (per pound) sodium and other salts. They are used in strengths often approaching 0.05 of 1%. They clean better, produce more nearly perfect sterility, give freedom from scale, are less likely to attack equipment and, most important of all, in some localities many of them are just as effective and free from complications in hard water as they are in soft water. It is often advantageous to use a softener, because a soft water is an excellent cleaning agent itself and in this process it helps in the rinsings as well as in scale prevention.

Besides all this, they may be so used that hot water, either for washing or rinsing, need not exceed 140 degrees F. and a hot water supply is almost always satisfactory below 150 degrees F., with the result that no steam boiler is needed, and in many localities, all needed heat may be obtained from an electric power line, through electric heaters.

At the same time they avoid the need for very hot water which hitherto has been found to precipitate scale, especially from hard waters. This scale has been found to be carried into the hot can and baked on, building up after some days' use a stone deposit that cannot be removed by ordinary treatment. Thus rust and contamination follow.

For supplying the hot water all that is needed is a tank of sufficient size to match the capacity of the machine. To provide for loss of temperature in delivery to the machine, the water in the tank may be raised to 150 degrees F. Temperatures in the rinse tank and the wash tank may be maintained constant by circulating hot water from the supply tank through coils in the wash tank and in the rinse tanks or by the use of electric flexible or rigid immersion heating units, or the same result obtained by additions of a little makeup water from the supply tank.

To obtain these and other ends, it has been found sufficient to drain and very thoroughly rinse the inside of the cans with fresh hot water to remove milk residues as completely as possible. During this treatment, in order to reduce gross contamination, especially from resistant spore formers, the outsides and bottoms of the cans are first thoroughly washed and rinsed. This prevents the carry-over of this material to the washing solution for the inside of the cans where dirt and highly resistant forms of bacteria might be distributed on the inside of the cans. This is an extra precaution to keep the cans sanitary and sterile. Then the interior of the can is treated with a combination of solvents and anionic or cationic and non-ionic or non-ionic detergents carried in a mist from an atomizer, often less than one fluid ounce of solution being used here per standard 40-quart can. After this solution has had time to act, the can is next thoroughly washed by a spray of a weaker solution of the same synthetic organic detergent atomized into it but without the solvent. Then it is rinsed, drained and covered with a sterilizing solution, which may be of a quaternary ammonium compound atomized over the interior of the cans, drained again, and then the cover, which has been similarly treated, put on.

The solution atomized into the can is at room temperature but when the extremely thin film forms and diffuses over the already wet hot metal, which is at approximately 145 degrees F. due to the washing and rinsing treatments the film quickly attains this temperature, so that detergent and germicidal action is intensified.

It is not necessary that the detergent and sterilizing solutions be atomized or be in the form of a fine mist, but that form of applying them appears to be the most economical and is highly effective.

Although cans and other utensils and equipment may be cleaned and sterilized with some of the unmodified anionic and cationic detergents, experience has shown that compositions like the ones set forth here give better results where the cleaning operation is a difficult one.

In order to obtain the most efficient cleaning and sterilizing action in accordance with the results of scientific investigation the primary and most difficult cleaning is carried out with a combination of a fat solvent or solvents and anionic synthetic organic detergents. This combination is also bactericidal and this quality is further enhanced by its application in solution at 140 degrees F. It has been particularly satisfactory in keeping tin and aluminum cans clean and bright and equally good for baked lacquer-coated cans.

The secondary cleaning and sterilizing treatment, which may be atomized like the first one, is given the cans following the washing, rinsing and draining of the primary anionic, cationic-non-ionic or non-ionic detergent solution, which may have a pH of 7.0 to 9.5. The secondary cleaning and sterilizing is carried out with either a quaternary ammonium compound or similar alkaline sterilizing agent at a pH of 7.0 to 9.5 and a temperature of about 140 degrees F. The compounds in the quaternary ammonium group of sterilizing agents may be used in a concentration of from one part to two thousand or less, depending upon the particular one employed.

Usually the first detergent solution for atomizing is so prepared as to be most effective as a detergent, and the second solution for atomizing is so prepared as to be especially effective as a sterilizer, while possessing at the same time a good wetting or penetrating quality along with that of excellent draining.

Where it is desirable to have one prepared concentrated solution, some very effective representative anionic compositions consisting of fat solvents and synthetic organic detergents have the following formulas: any one of the three used at from about 1.25% to 25% in the solution for atomizing, depending on the condition of the cans to be cleaned:

*No. 1*

| | Per cent |
|---|---|
| Petroleum ether | 5.0 |
| Carbon tetrachloride | 5.0 |
| Ethylene chlorhydrin | 5.0 |
| Triethylene glycol | 15.0 |
| Sodium aryl alkyl polyether sulfonate, 30% solution | 15.0 |
| Alkyl aryl sulfonate, 30% solution | 25.0 |
| Water | 30.0 |
| | 100.0 |

*No. 2*

| | Per cent |
|---|---|
| Isopropanol | 10.0 |
| Ethylene glycol monoethyl ether ("Cellosolve") | 20.0 |
| Sodium aryl alkyl polyether sulfate, 30% solution | 15.0 |
| Alkyl aryl sulfonate, 30% solution | 25.0 |
| Water containing 3% or less of trisodium phosphate, soda ash or modified soda | 30.0 |
| | 100.0 |

*No. 3*

| | Per cent |
|---|---|
| Ethanol | 5.0 |
| Propylene glycol | 10.0 |
| Diethylene glycol monoethyl ether ("Carbitol") | 15.0 |
| Sodium aryl alkyl polyether sulfonate, 30% solution | 10.0 |
| Alkyl aryl sulfonate, 30% solution | 30.0 |
| Water | 30.0 |
| | 100.0 |

These commercially known sulfates and sulfonates form homogeneous transparent brown stable solutions that have shown remarkable detergent qualities. The fat solvents may be petroleum ether, naphtha, the chlorinated hydrocarbons, like carbon tetrachloride, trichlorethylene, chloroform, cyclohexanol, tetrahydronaphthalene, and the alcohols, such as ethanol and isopropanol. Tests have shown that these solvents have more or less bactericidal action in solution.

These materials act as if held in a chemical union by the use of the sodium aryl alkyl polyether sulfonates and/or sulfates and the alkyl aryl sulfonates.

The operator himself may prepare a very satisfactory solution for atomizing from any one of a number of water soluble fat solvents such as ethanol, isopropanol, allyl alcohol, the water-soluble glycols like ethylene glycol, diethylene glycol, triethylene glycol, propylene glycol. Also the water-soluble glycol-ethers like ethylene glycol monoethyl ether (Cellosolve), ethylene glycol monobutyl ether (Butyl Cellosolve), diethylene glycol monoethyl ether (Carbitol) and diethylene glycol monobutyl ether (Butyl Carbitol). Any one of these may be used at the rate of from 0.15 of a pint to 3.0 pints or more which corresponds to the quantities from 1.25% to 25% in the prepared compositions as described for addition to five gallons of atomizing solution. To this solution may be added the anionic, cationic-non-ionic or non-ionic synthetic organic detergent at the rate of from 0.20 of a pint to 4.0 pints for the above percentages. But the operator may, of course, vary the quantities of these ingredients to suit the needs of the cleaning operation.

This atomizing is really a prewash or conditioning treatment whereby the combined action of solvent, detergent, soft water and high temperature (imparted by the hot can) soften and convert to a more or less fluid state any deposits of butterfat and casein in the can, so that later, when it reaches the washing positions, the combined action of high temperature, detergent and the brushing effect of an abundant spraying with soft hot water, at 30 lbs. pressure will completely remove any fluid or small loose particles on the inside surface of the can and cover.

After the cans have been washed and thoroughly rinsed and drained, they are finally atomized on the inside, covers, likewise, with an aqueous solution of one of the high molecular quaternary ammonium compounds and the non-ionic alkylated aryl poly-ether alcohol. One of the former is an alkyl-dimethyl-benzyl-ammonium chloride with the formula:

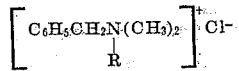

"R" represents alkyl radicals ranging from $C_8H_{17}$ to $C_{18}H_{37}$. Other compounds that may be used are: Di-isobutyl cresoxy ethoxy ethyl di-methyl benzyl ammonium chloride. This is the cresoxy compound:

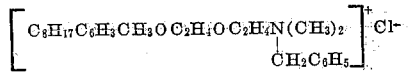

or N (higher acyl esters of colamino formylmethyl) pyridinium chloride.

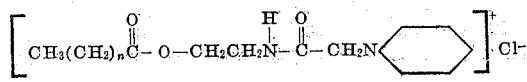

or: Di-isobutyl phenoxy ethoxy ethyl dimethyl benzyl ammonium chloride:

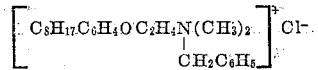

The bromide and iodide salts are also satisfactory for this purpose.

The germicidal power is present in these and other surface active quaternaries in varying degrees, so for practical use as sterilizing agents, it is necessary to vary the concentration at which they are used accordingly.

Where the quaternary ammonium compounds are used for sterilizing usually at a concentration of from 200 to 500 p. p. m., it is sometimes necessary to include in the solution at least an equal concentration of a non-ionic compound. The quaternaries used alone are not compatible with some water softeners and other salts, but the non-ionic compounds will keep them in solution and active except against a very small group.

While it is recognized, as already described, that the combination of anionic solution for cleaning and a cationic one for sterilizing yields superior results, still experience has shown that very satisfactory results may also be obtained by using a cationic solution (combined with a non-ionic one) for both the cleaning and sterilizing treatments. The advantage in this case is that the cans or utensils are subjected to a strong sterilizing action all during the cleaning process and are subsequently subjected to the usual sterilizing treatment with a fresh solution of the same kind at the end of the process.

Some cationic compositions which have yielded very good results have the following formulas:

| 1 | Per cent |
|---|---|
| Isopropanol | 30.0 |
| Alkylated aryl poly-ether alcohol | 20.0 |
| Di-isobutyl cresoxy ethoxy ethyl di-methyl benzyl ammonium chloride | 15.0 |
| Water | 35.0 |
| | 100.0 |

| 2 | Per cent |
|---|---|
| Ethanol | 5.0 |
| Triethylene glycol | 25.0 |
| Alkylated aryl poly-ether alcohol | 25.0 |
| Methyl dodecylbenzyl trimethyl ammonium chloride, 50% solution | 30.0 |
| Water | 15.0 |
| | 100.0 |

| 3 | Per cent |
|---|---|
| Carbon tetrachloride | 5.0 |
| Ethylene glycol monoethyl ether | 20.0 |
| Alkylated aryl poly-ether alcohol | 30.0 |
| Di-isobutyl phenoxy ethoxy ethyl dimethyl benzyl ammonium chloride | 15.0 |
| Water | 30.0 |
| | 100.0 |

The solvents employed were petroleum ether, naphtha, cyclohexanol, tetrahydronaphthalene and the alcohols, such as ethanol and isopropanol. Some chlorinated products may also be used.

Where tinned-iron cans have been washed according to any of the above procedures, after rinsing, they must be sterilized by atomizing with a quaternary ammonium solution that will not cause corrosion or rusting if they remain wet. The rusting of a tin can starts with the iron exposed in the pores of the tin plate. It is due to the electrolytic action arising from the tin-iron couple. I have found that a weak ammonia solution does not attack the tin and pasifies the iron, so that electrolytic action is stopped. Therefore, in sterilizing tin cans the following formula has been found satisfactory:

| | Per cent |
|---|---|
| Quaternary ammonium compound, 10% solution | 0.02 |
| Non-ionic compound | 0.05 |
| Ammonium hydroxide up to | 0.50 |
| Water | 99.43 |
| | 100.00 |

Usually less than 0.5% of ammonia is satisfactory.

Ethylene diamine, propylenediamine, monoisopropanolamine have all been effective in preventing the appearance of rust. The first of these would not be always practical on account of the hazards involved in its use.

If for any reason it is desirable to reduce the amount of moisture in the cans, perhaps to satisfy a board of health inspector, five percent or more of ethanol may be used. Ethanol, denatured with ammonia, may be purchased for this use. Such a formula would be like the preceding, except for the addition of five percent or more of ethanol and a corresponding reduction of five percent or more of water. This latter is effective because the high temperature of the metal (140°–150° F.), which the atomized solution strikes, rapidly volatilizes most of the ammonia and alcohol.

Through the years, it has been necessary to dry the tinned-iron cans with steam and/or blasts of hot air to prevent rusting and bacterial multiplication to meet board of health regulations. Both requirements are met by this procedure for the moist quaternary remains active as a sterilizing agent and the trace of ammonia prevents rust from forming. The process at the same time saves the expense of steam and the operation of the blower with air at about 250° F.

Even where steam and hot air are used for drying, it usually happens that sufficient moisture is left to produce rust in cans as is evidenced by the constant appearance of rusty cans in service. Traces of ammonia or some of its compounds may be used equally well to prevent rust from appearing in cans washed and sterilized by these other processes.

Other features and advantages will hereinafter appear.

In the accompanying drawing the figure is a diagrammatic side view of an apparatus operating the present invention, many parts being omitted.

The drawing shows a suitable number of can washing positions to be incorporated in a modification of any one of a number of standard commercial types of can washing machines.

In that machine the cans are shown as occupying positions 1, 2, 3 and so on to 15, sliding on rails diagrammatically shown at 16.

The can covers in such machines are usually washed with their respective cans, and might be diagrammatically shown as traveling above and with them though not so indicated at the positions in the drawing.

*Position 1.*—In the diagram, the can rests upon rails 16 in position 1, so that the last residue of milk drains into a pan 32, from which it drains off into a milk can through an outlet at the lowest point of the pan at 33.

Between positions 1 and 2 are two vertical swinging doors 34 hinged at one side with a spring attached, so that as the can moves forward to position 2, it will push the doors open, but then releases them so that they will return to the closed position before the can reaches position 2 and trips the valve, not shown, to start the spray rinse on the inside and outside of the can. These doors are a sanitary precaution and protect the milk running into the drip pan from the gross contamination that might spatter into it when the outside of the can is rinsed in position 2.

All spray and atomizer valves may be of the trip variety, so that they are released by the cans when the latter come into position and continue to deliver solution as long as the surfaces of the cans may be satisfactorily covered, except in the case of the atomizers where a short burst is sufficient to cover the surfaces.

*Position 2.*—The can travels on to position 2, in which it is rinsed on the inside with a tempered fresh preferably softened water at 30 lbs. pressure. This inside spray 35 is shown behind the broken off outside spray 37 for clarity in the drawing. The three outside sprays for the outside rinse are shown at 37 and the top spray at 38. The drainings from the inside and outside of the can may run onto a shield 36a above a tank 36 to carry them off and are wasted. The spraying on the inside of the cans with fresh tempered softened water removes milk residues and fat. The spraying with tempered softened water on the outside, drawn from tank 36 of the can, removes gross filth. The outlets of the sprays are set so that the jets of water impinge on the sides and bottoms of the cans at an angle with the result that the shearing action combined with the pressure of the streams gives an effect equivalent to a brushing of the surfaces.

*Position 3.*—In this position the cans receive an exact duplication of the treatment received in position 2, except that the hot water (140°–150° F.) is not tempered with cold water as in position 2. The hot water spray for the insides of the cans is 39 and that for the outside and bottom is 40 and 41 respectively. The drainage from this position runs into the tank 36.

*Position 4.*—The interior of the hot cans are treated preferably with an atomized mist at 42 of one of the solvent-containing compositions previously described. Less than an ounce of a cold or room temperature solution of the detergent (from the 5-gallon carboy or tank) is highly effective as a pre-wash treatment, i. e., one and one-half to 3 ml. per square foot of surface to be cleaned. The fat is dissolved and any residues loosened from the surface by this relatively strong solution. This treatment is given early in the cleaning process, so that the relatively strong detergent will have a longer time to dissolve, penetrate and loosen any residues before the cans are washed on the inside at positions 7, 8 and 9. The strong solution for this treatment is in the small special tank or carboy 43.

In this position 4, the cans may receive a thorough washing on the outside bottoms with spray at 44 and sides of the cans with spray at 45 with the detergent solution at 145° F. under pump pressure of 30 lbs. through spray streams like those described for the outside of the cans in position 2. Thus, due to the way these streams strike the surfaces and under pressure, the effect is similar to a brushing in loosening adhering soil.

The detergent solution for this position may be prepared in tank 46.

*Position 5.*—The mechanical arrangement is similar to that in position 4, except that fresh water at 145° F. and 30 lbs. pressure is used for rinsing the outside bottoms at 47 and sides at 48 of the cans. The drainings run into a shallow tank 49 under this position and position 6. This drainage runs by pipe 49a to tank 36 and supplies most of the makeup water for rinsing the outside (bottoms and sides) of the cans in positions 2 and 3.

*Position 6.*—In this position, the cans are allowed to drain, so that the little bacterial contamination remaining will drain off and leave relatively few drops of the diluted contamination to fall into the detergent solution (tank 54) used for washing the insides of the cans. At this point, gross contamination has been removed from the outside of the cans.

In washing and rinsing the outside bottoms of the cans, the detergent solution and rinse water should drain off through the holes in the rings, which form the foot or base, on which the cans stand. As there may be dents in the bottoms of the cans or uneven surfaces in the valleys leading to these outlets, a small blower 50 is provided at the top of position 6 to blow water away from the inverted bottoms of the cans. The drainings from the cans in this position fall into the shallow tank 49, which drains by pipe 49a into tank 36.

*Positions 7, 8 and 9.*—These three positions all successively give the same washing treatment to the insides of the cans with a solution containing from 0.05% to 1.0% of the anionic, cationic-non-ionic or non-ionic detergent composition at a temperature of 145° F. and sprayed with a pump pressure of 30 lbs. These sprays are 51, 52 and 53. The drainings from these cans fall back into tank 54 are reused.

If the foam in the wash tank 54 becomes excessive, it may be reduced with a little octyl alcohol or any other suitable foam depressant.

*Position 10.*—In this position, the insides of the cans are given an ample rinsing with fresh water at 145° F. and 30 lbs. pressure by spray 55. All traces of the washing solution are completely rinsed out. The rinsings from this treatment fall into shallow tank 56 and supply the makeup water for tank 54. When the solution level in this tank is normal, any excess water above that drains off by pipe 58 to tank 36 under positions 2 and 3. The overflow control valve is shown at 57.

*Position 11.*—This position provides extra draining time for cans rinsed in position 10. The drainings will be very little, only a few drops, and may be wasted, if an anionic detergent is used in tank 54. Otherwise they may fall into tank 56 and add to the makeup water for tank 54 or tank 36 for outside rinsing of cans in positions 2 and 3.

*Position 12.*—In this position, the inside of the cans and the inside of their respective covers are atomized, at 59 and at 60, with a cold cationic and non-ionic sterilizing solution at a pH of approximately 7.0 to 9.5. The atomizers may be released by a trip lever like the sprays, only in this case a spring, ordinarily closes the valve, when it has been open for only a brief burst. The supply tank for this solution is shown at 61. This may be a carboy or tank set up at the side of the machine of five or ten gallons capacity, depending on the size of the operation. This solution, like all the others, should be prepared fresh daily.

*Position 13.*—The can and top are dried by a blower 62 provided with a heater 63 and a filter 64.

*Position 14.*—The cans are rolled over to stand tops up in this position.

*Position 15.*—As the cans move into this position from 14, the covers which have followed their respective cans on an overhead track and received the same treatment at the same time as their own particular cans now slide down into place on their cans and are pressed into position.

The pump 72, which gives a 30 lb. pressure in the header 73, which supplies the fresh hot rinse water for sprays 35 and 39 in positions 2 and 3 outside sprays 47 and 48 in position 5 and for spray 55 in the rinse in position 10, draws the fresh hot water from a hot water tank (not shown) through the pipe 74.

The procedures above avoid the difficulty which has arisen in washing cans in ordinary practice, when a hard water is used, even if the water is only slightly hard. Experience has shown that prior procedures, almost invariably have produced a corroding and a forming of scale in various parts of the mechanism, especially at the rinse tank and in the parts of the machine adjacent to it, which are kept hot by the high temperatures deemed necessary hitherto. The low temperatures used according to the present invention materially reduce this tendency to corrosion and the depositing of scale and both corrosion and depositing of scale are eliminated by the softened water and the anionic, cationic or non-ionic compositions and ammonia used in the solutions of the present invention.

Having thus described certain embodiments of the invention in some detail, what is claimed is:

1. An alkaline solution process for washing and sterilizing cans at temperatures not exceeding about 150° F. which consists in first washing the exteriors of the cans with water carrying a detergent, and then washing the interiors of the cans with a non-corroding alkaline synthetic organic detergent solution carrying a water-soluble fat solvent, draining the cans, then sterilizing the interiors with a sprayed solution of a cationic quaternary ammonium halogen compound and also including a rust-preventing compound selected from the group consisting of alkali-reacting amine and aqua ammonia.

2. An alkaline solution process for washing and sterilizing cans at temperatures not exceeding about 150° F. which consists in separately washing the outside and inside of the can, the inside washing being effected with a water solution carrying both a fat solvent and an anionic synthetic detergent, then rinsing with hot water, and finally sterilizing with a solution carrying a quaternary ammonium derivative plus a small quantity of aqua ammonia.

3. An alkaline solution process for washing and sterilizing cans at temperatures not exceeding about 150° F. which consists in washing the inside and outside of a can preliminarily, again washing the inside of the can with hot mixed solution of a fat solvent and detergent at a temperature of not over 150° F., rinsing with hot water at a temperature not exceeding about 150° F., and then sterilizing the cans by spraying them with a solution carrying a cationic quaternary ammonium halogen compound, and also containing a nonionic detergent compound adapted to keep the quaternary compound in solution and also including a compound selected from the group consisting of a rust preventing alkali-reacting ammonia and somewhat volatile amines.

4. An alkaline solution process for washing and sterilizing cans at temperatures not exceeding about 150° F. which consists in washing the inside and outside of the can separately, rinsing the inside with heated water at a temperature about 150° F., spraying the inside of the can with a fat-solvent containing solution, draining the can, repeatedly spraying the can with a detergent solution, rinsing the can, spraying the can with a sterilizing solution containing alkaline material selected from the group consisting of ammonia and amines with short chain substituents, and draining and drying the can.

5. An alkaline solution process for washing and sterilizing cans at temperatures not exceeding about 150° F., which consists in washing the inside and outside of the can separately, rinsing the inside with heated water at a temperature about 150° F., spraying the inside of the can with a fat-solvent containing solution, draining the can, repeatedly spraying the can with a detergent solution, rinsing the can, spraying the can with a sterilizing solution containing alkaline material selected from the group consisting of ammonia and amines with short chain substituents, and draining and drying the can, and collecting the later drainings and returning them for an earlier spraying aforesaid.

References Cited in the file of this patent

UNITED STATES PATENTS

| Number | Name | Date |
|---|---|---|
| 1,353,654 | Harrison | Sept. 21, 1920 |
| 1,783,478 | Moore | Dec. 2, 1930 |
| 2,338,689 | Parker | Jan. 4, 1944 |
| 2,356,587 | Hentrich | Aug. 22, 1944 |
| 2,424,049 | Parker | July 15, 1947 |
| 2,509,003 | Lathrop | May 23, 1950 |